E. A. HAWTHORNE.
VEHICLE LAMP.
APPLICATION FILED JUNE 26, 1916.

1,220,334.

Patented Mar. 27, 1917.
2 SHEETS—SHEET 1.

Inventor
Ellsworth A. Hawthorne
By Ollie Spear Jr.
Attorney

E. A. HAWTHORNE.
VEHICLE LAMP.
APPLICATION FILED JUNE 26, 1916.

1,220,334.

Patented Mar. 27, 1917.
2 SHEETS—SHEET 2.

Inventor
Ellsworth A. Hawthorne

By Ellis Sprague
Attorney

UNITED STATES PATENT OFFICE.

ELLSWORTH A. HAWTHORNE, OF BRIDGEPORT, CONNECTICUT.

VEHICLE-LAMP.

1,220,334. Specification of Letters Patent. Patented Mar. 27, 1917.

Application filed June 26, 1916. Serial No. 105,787.

*To all whom it may concern:*

Be it known that I, ELLSWORTH A. HAWTHORNE, a citizen of the United States, residing at Bridgeport, county of Fairfield, Connecticut, have invented certain new and useful Improvements in Vehicle-Lamps, of which the following is a specification.

This invention relates to vehicle lights of the class known as spotlights, and which are adapted to be clamped to the windshield or at any other convenient place on an automobile or other vehicle in such adjustable relation thereto that it may be manipulated to project a beam of light in any desired direction. In addition to the adaptability of such a structure as to its general lighting possibilities, the position of these lamps enables them to constitute a convenient support for the mirror usually employed to show to the driver the traffic approaching from the rear. The mirror scope has been mounted in a variety of positions with relation to the lamp. Where it has been set in the shell of the lamp, or rigidly attached to the top of the lamp rim, the structure has been open to the disadvantage that when the lamp is swung to a position in which it will illuminate the road ahead the mirror is thereby moved out of operative position and is therefore ineffective to perform its function of showing traffic approaching from the rear.

Moreover, when the mirror is properly positioned to perform its reflecting functions, the lamp itself is necessarily swung askew. This is objectionable in that the lamp is not in position to illuminate the road and in that it imparts a displeasing appearance to the car. Moreover, when so positioned the mirror is exposed and liable to breakage.

I have found that the mirrorscope may be mounted on the lamp in such a way as to secure the advantage of the universal joint mounting without necessitating the movement of the lamp from its forwardly directing position.

According to my invention the support for the mirror is swiveled in a lug formed on the lamp shell at that side farthest from the windshield. This allows the mirror to be always positioned in its effecetive reflecting relation, irrespective of the position of the lamp.

In addition to this adjustment, the mirror is reversible with respect to the lamp, thus adapting it for use on either side of the windshield according to whether the car has right or left hand control, and always disposing the mirror in proper reflecting position. The support for the mirror itself is under spring tension so that it will remain in any position to which it has been turned.

The construction and operation of my device is fully described in the specification which follows. I have shown embodiments which have been found satisfactory in use and well adapted to the requirements of manufacture. Throughout this specification, and drawings, like reference numerals are applied to indicate corresponding parts, and in the drawings.

Figure 1:
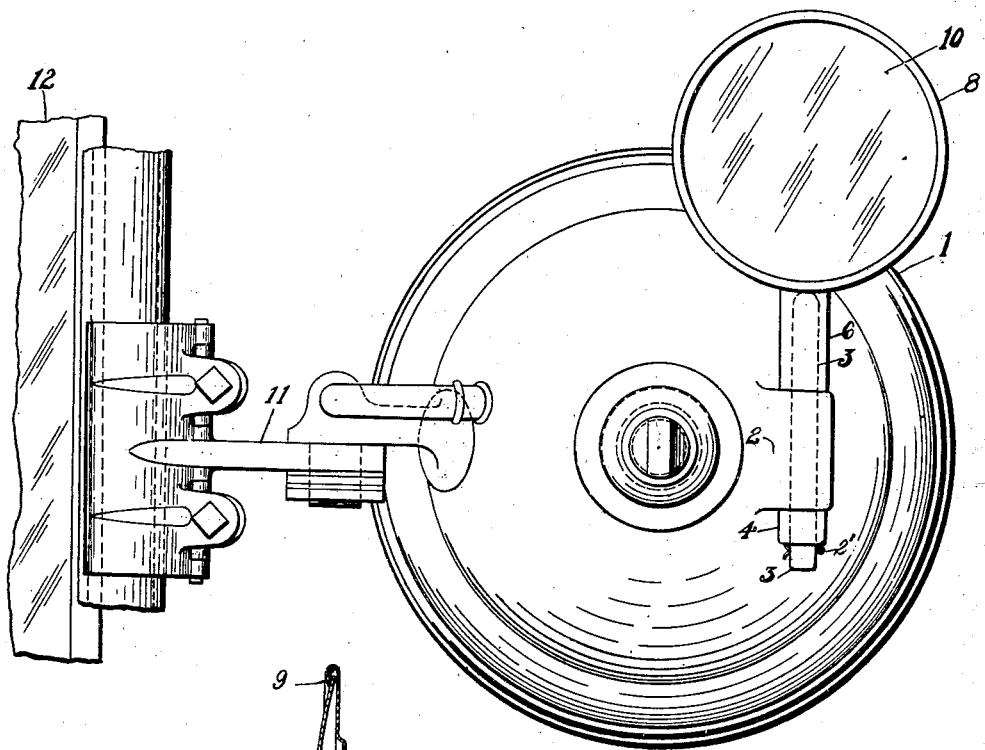
Figure 1 is a rear elevation of a spotlight equipped with my mirror and shown in applied position on a windshield.
Figure 2:
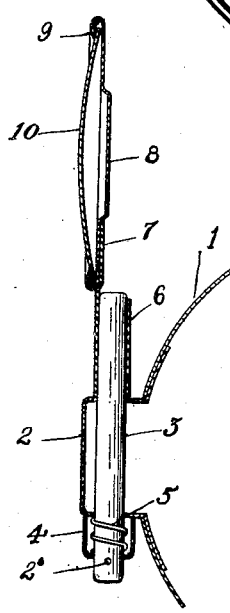
Fig. 2 is a vertical central section through the mirror and lug of the lamp shell, and particularly illustrating the manner of supporting the mirror.

I have indicated at 1 a lamp of the spotlight type described. Projecting laterally from the shell of the lamp 1 and disposed well back toward the handle of said lamp is an apertured lug 2 through which a mirror supporting stem 3 is mounted. Loosely held against the under fac of the lug 2 in any suitable manner as by a cotter pin $2^1$ extending through the rod 3 is a shell 4 in which a coil spring 5 is mounted and concealed. The spring 5 provides a tension on the rod 3 sufficient to retain the mirror in any position to which it may be turned.

That portion of the rod 3 above the lug 2 is received in a mirror frame holder 6 which is turned about the rod and has an upright extension 7 which is welded or otherwise permanently secured to the back of a mirror frame 8. The edge of the frame 8 is turned over to receive and clamp the mirror retaining ring 9 of a mirror 10.

Where the lamp is mounted on a car having right hand control, as shown in the drawings, the lamp supporting bracket 11 is clamped to the right hand edge of the windshield 12. Where the car has left hand control and it is therefore desirable to position the lamp on the left hand edge of the windshield, the lamp is inverted and attached to said left hand side of the windshield and the mirror supporting stem 3 is withdrawn from the lug 2 and inserted into said lug from the opposite end thereof so as to position the mirror in the same relation as shown in the figures of the drawing, as they now stand. This enables the mirror to have a constant position with reference to the lamp and windshield irrespective of the side of the windshield to which the lamp is fastened. Inasmuch as the support for the mirror is fastened on the lamp itself and has adjustment independently of the adjustment of the lamp through its supporting bracket, the mirror may always be positioned to show traffic approaching from the rear irrespective of the adjustment of the lamp supporting bracket and without necessitating that the lamp be swung out of the longitudinal line of the car as is necessary where the mirror is rigidly carried by the lamp.

Figure 3:
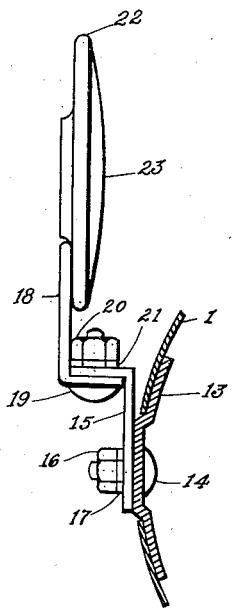
Figs. 3 and 4 are detail views showing various modifications.

In one modification of my invention, shown in Fig. 3, a flat faced lug 13 is welded or otherwise secured to the inner face of the lamp shell, and a clamping bolt 14 is set through said shell and lug and through an angle iron 15 welded to the outer face of said lug. The bolt 14 is held by a check nut 16 and a lock washer 17. The free end of the angle iron 15 is lapped over the similar end of another angle iron 18 and fastened thereto by a bolt 19, a check nut 20 and a lock washer 21. To the angle iron 18 is welded or otherwise secured a mirror frame 22 in which a mirror 23 is mounted. The mirror is thus capable of turning about both a vertical and a horizontal axis with relation to and independently of the movement of the lamp, thereby permitting it to be positioned at any desired angle with respect to either axis. The lock washers 17 and 21 provide a spring tension sufficient to maintain the mirror in any position of adjustment.

Figure 4:
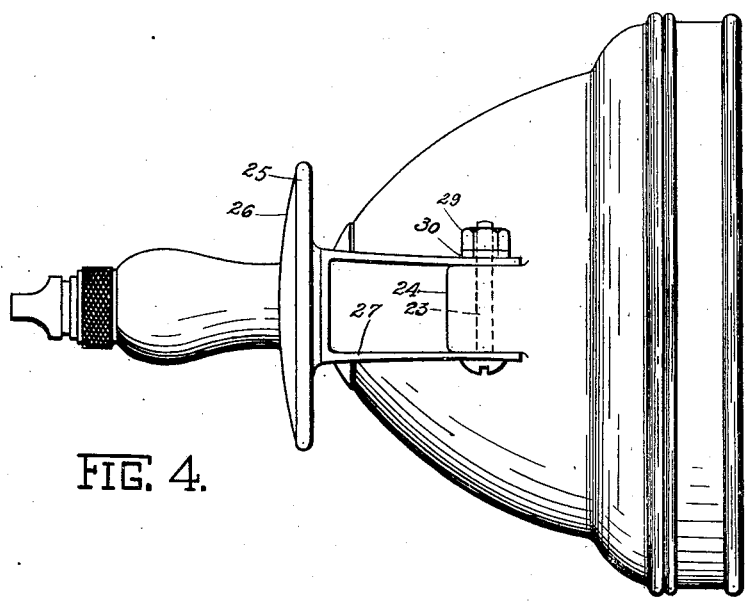

In the modification of my invention shown in Fig. 4, a side lug 24 similar to the lug 2 is welded to the lamp shell 1, but the mirror frame 25 of the mirror 26 is welded to a V-shaped rearwardly extending bracket 27, the arms of which lap over the opposite sides of the lug and are pivotally clamped thereto by a bolt 28, a check nut 29 and a lock washer 30. This form of mount allows the mirror to swing laterally about the bolt 28 as an axis. The lock washer 36 provides a spring tension adapted to maintain the bracket in any position of adjustment.

In the modification shown in Fig. 3, the mirror is capable of being reversed when the lamp is swung over and attached to the opposite edge of the windshield. The form of Fig. 4 does not require to be reversed when the lamp is changed from one side of the windshield to the other.

Various modifications in the form and construction of my invention may obviously be resorted to if within the limits of the appended claims.

What I therefore claim and desire to secure by Letters Patent is:

1. A lamp, a bracket therefor adapted to attach said lamp to an edge of a support, said lamp and bracket being bodily invertible for attachment to the opposite edge of the support, a lateral bearing on said lamp, and a member reversibly and inveribly mounted in said bearing for supporting a mirror above the horizontal axis of the lamp in either position of the lamp.

2. A lamp, a bracket therefor adapted to attach said lamp to a vertical edge of the wind shield of an automobile, said lamp and bracket being bodily invertible for attachment to the opposite edge of the windshield, a bearing on said lamp having an axial opening and a member adapted for insertion through either end of said bearing and wholly removable therefrom for purposes of reversal and adapted to support a mirror above the horizontal axis of the lamp in either position of the lamp.

3. A lamp having a bearing, a member rotatably mounted in said bearing and supporting a mirror at one end thereof, said member being removable from said bearing and insertible from the opposite end thereof.

4. In combination with a lamp having a lateral lug, a mirror supporting stem reversibly mounted in said lug, resilient means for exerting tension on said stem, and a mirror carried by said stem.

5. In combination with a lamp having a lateral lug, a mirror supporting stem reversibly mounted in said lug, a shell about said stem, a spring concealed within said shell and providing a frictional means to exert tension on said stem, a frame holder disposed about said stem, and having an upright extension, a mirror frame permanently secured to said extension, and a mirror mounted in said frame.

6. In combination with a lamp having a bearing, a mirror supporting stem adjustably fitting said bearing, a yielding clamp for holding said stem seated in said bearing, and a mirror carried by said stem.

7. In a lamp of the class described, a double ended lateral socket on the horizontal axis thereof, and an extension removably supporting a mirrorscope above said horizontal axis from either side of said double socket.

In testimony whereof I affix my signature in presence of two witnesses.

ELLSWORTH A. HAWTHORNE.

Witnesses:
E. HORACE HAWTHORNE,
E. STEWART HAWTHORNE.